United States Patent
Wang

(10) Patent No.: US 8,414,805 B2
(45) Date of Patent: *Apr. 9, 2013

(54) POROUS CARBON FOAM COMPOSITES, APPLICATIONS, AND PROCESSES OF MAKING

(75) Inventor: Jing Wang, Amherst, MA (US)

(73) Assignee: ElectroMaterials, Inc., Amherst, MA (US)

( * ) Notice: Subject to any disclaimer, the term of this patent is extended or adjusted under 35 U.S.C. 154(b) by 805 days.

This patent is subject to a terminal disclaimer.

(21) Appl. No.: 12/325,844

(22) Filed: Dec. 1, 2008

(65) Prior Publication Data

US 2009/0136809 A1 May 28, 2009

Related U.S. Application Data

(63) Continuation-in-part of application No. 11/202,989, filed on Aug. 11, 2005, which is a continuation-in-part of application No. 10/919,450, filed on Aug. 16, 2004, now Pat. No. 7,704, 422.

(60) Provisional application No. 60/991,276, filed on Nov. 30, 2007.

(51) Int. Cl.
*C01B 31/02* (2006.01)
*C01B 31/08* (2006.01)

(52) U.S. Cl. .......... 264/29.6; 264/105; 423/445 R
(58) Field of Classification Search .......... 264/29.1, 264/29.6, 105; 423/445 R
See application file for complete search history.

(56) References Cited

U.S. PATENT DOCUMENTS

| | | | |
|---|---|---|---|
| 5,172,307 A | 12/1992 | Tabuchi et al. | |
| 5,369,546 A | 11/1994 | Saito et al. | |
| 5,776,633 A | 7/1998 | Mrotek et al. | |
| 5,973,912 A | 10/1999 | Kibi et al. | |
| 2004/0132845 A1* | 7/2004 | Rhine et al. | 521/82 |
| 2005/0014925 A1* | 1/2005 | Yokota et al. | 528/353 |
| 2005/0229781 A1* | 10/2005 | Hori et al. | 95/90 |
| 2006/0000763 A1* | 1/2006 | Rinker et al. | 210/282 |
| 2006/0033225 A1 | 2/2006 | Wang | |
| 2006/0033226 A1 | 2/2006 | Wang | |

FOREIGN PATENT DOCUMENTS

WO  WO2006023419  2/2006

* cited by examiner

*Primary Examiner* — Leo B Tentoni
(74) *Attorney, Agent, or Firm* — Jackson Walker L.L.P.

(57) ABSTRACT

Processes for producing porous carbon foam composites and activated carbon/carbon (AC/C) composites from polyimide precursors, activated carbon powder, and optionally carbon fiber and other additives. The AC/C composites may be used for carbon electrodes in electrochemical capacitors.

13 Claims, No Drawings

POROUS CARBON FOAM COMPOSITES, APPLICATIONS, AND PROCESSES OF MAKING

RELATED APPLICATIONS

This application is a continuation-in-part of U.S. patent application Ser. No. 11/202,989, filed on Aug. 11, 2005, which is a continuation-in-part of U.S. patent application Ser. No. 10/919,450, filed Aug. 16, 2004 now U.S. Pat. No. 7,704, 422. The entire content of both of these applications is hereby incorporated by reference.

This application claims priority to U.S. Provisional Patent Application Ser. No. 60/991,276, entitled "Porous Carbon Composites and Their Applications" filed on Nov. 30, 2007, having Jing Wang, listed as the inventor, the entire content of which is hereby incorporated by reference.

FIELD OF THE INVENTION

The present invention relates to carbon-containing composite materials which have applications in capacitors and electrochemical cells. More specifically, the present application provides activated carbon/carbon (AC/C) compositions, methods of producing said compositions, and use of said compositions in electrodes and current collectors of asymmetrical capacitors.

BACKGROUND

The methodology of preparing polymer precursor powders comprising polyimide has been described in U.S. Patent Publication No. 2006/0033225, U.S. Patent Publication No. 2006/0033226, and PCT Patent Publication WO 2006/023419.

U.S. Pat. Nos. 5,172,307, 5,369,546, 5,776,633, and 5,973,912 describe AC/C composites produced by applying phenolic resin as a binder to activated carbon powder followed by curing the resin and pyrolysis. The carbon phase derived from phenolic resin is a dense carbon without sufficient pore surface area for many applications. Thus, the AC/C composites prepared using these methods had pores blocked by the binder and had significantly reduced surface area compared to the conventional activated carbon powders used as electrode materials.

Porous carbon phases, which bind to other materials, possess interpenetrating pore structure, high density, and high surface area, are highly desirable for making porous carbon foam composites. The previous art as described in U.S. Patent Publication 2006/0033226 has provided a group of polymer binders which, after pyrolysis, produce such porous carbon foam phases.

Polyimide precursors are prepared from monomers of aromatic dianhydrides, aromatic diamines, and optionally aromatic polyamines with amine functionality of two or greater. In a typical procedure, the monomers are dissolved in an organic solvent, such as dimethylacetamide, with stirring to form a viscous solution of poly (amic acids). The imidization is carried out to produce polyimide precipitates. The solvent is removed from the product by distillation. As an option, the polyimide precursor powder is thermally annealed at 300-500° C.

In the present invention, the polyimide precursor powders of U.S. Patent Publication No. 2006/0033225, U.S. Patent Publication No. 2006/0033226, and PCT Patent Application US2005/028890, are used in a process for forming activated carbon/carbon (AC/C) composites and porous carbon foam composites. The polyimide precursor powders are self binding and bind to other materials under a compression pressure to form a monolith. The carbon phase derived from the polymer precursors after pyrolysis possesses high surface area above 600 $m^2$/gram and high density above 0.7 gram/cc. The present invention provides porous carbon foam composites, methods of producing, and applications, of porous carbon foam composites applying the polyimide precursors for the carbon phase and incorporating other active materials therein. Applications of porous carbon foam composites include, but are not limited to, use as electrodes or as a combined electrode and current collector for electrochemical capacitors, asymmetric capacitors, batteries, lithium ion batteries, fuel cells, sensors, water treatment facilities, for use as adsorption media for filters, and for use as catalyst support, among other uses.

The present invention provides monolithic porous carbon disks prepared by compressing the polymer precursor powder into a monolith at ambient temperature followed by pyrolysis under protection of an inert atmosphere. The porous activated carbon/carbon composites were prepared by mixing the polymer precursor and activated carbon powder and, as an option, carbon fiber into a homogeneous mixture and then compressing the mixture into a monolith followed by pyrolysis under protection of an inert atmosphere. The carbon phase derived from the polymer precursor possesses high surface area at nano- and micro-pore region and high density in this embodiment.

AC/C composites as described herein have application in electrochemical capacitors. An electrochemical capacitor comprises at least one electrochemical cell and at least two current collectors which are connected to at least a first and a second electrode, respectively. A porous separator is sandwiched between the two electrodes, and liquid electrolyte impregnates the pores of electrodes and separator. The present invention produces such electrochemical capacitors in which at least one of the electrode plates comprises AC/C composites. AC/C composites may be used in both the electrode and the current collector.

For electrochemical capacitors comprising two or more electrochemical cells which are connected in series, the adjoining cells are separated by a cell separator which is an electron conductor and ion insulator. The cell separator may be bound to each of the adjacent electrodes to form bipolar plates. Such bipolar plates may comprise AC/C composites as described herein as electrode plates bound by a cell separator.

When the AC/C composites of the present invention were applied as electrodes for electrochemical capacitors, the specific capacitance of the AC/C composite is found to be 2 to 4 times higher while the equivalent series resistance (ESR) is significantly lower compared to the conventional carbon electrodes.

SUMMARY

The present invention relates to the preparations and applications of monolithic porous activated carbon/carbon composites comprising polyimide precursors for one carbon phase and activated carbon powder and carbon fiber as the other carbon phase. The preparation method of polyimide precursors has been described in U.S. Patent Publication No. 2006/0033226. As an option, the AC/C composites could be further modified before use.

The present invention further relates to the preparations of porous carbon foam composites applying polyimide precursors for one carbon phase and incorporating other materials including various forms of carbons, graphite, silicon oxides, silicon, zeolite, metal oxides, metals, metal alloys, metallic compounds, as well as various organic and inorganic materials in the form of particles and fibers, into the composite.

The present invention also relates to the preparations of transition metal- or metal-doped carbon composites applying metal-doped polyimide precursors for a first carbon phase and other materials, including various forms of carbons, graphite, metals, metal alloys, metal oxides, metallic compounds, silicon, silicon oxides, zeolite, and inorganic and organic materials in the form of particles, powders, or fibers, for the second phase.

Some of the applications of AC/C composites, metal- or transition metal-doped AC/C composites, and porous carbon foam composites that incorporate other active materials, are in the field of electrodes for electrochemical devices, batteries, fuel cells, filtration media, catalyst support, sensors.

One of the applications of porous carbon foam composites is in porous carbon/zeolite composite and transition metal-doped porous carbon/zeolite composite for use as adsorption medium for filters, particularly for air filters.

Another application of the porous carbon foam composites is in titanium oxide/carbon foam composites, graphite/carbon foam composites, silicon/carbon foam composites, silicon/graphite/carbon foam composites, porous tin oxide/carbon foam composites, metal alloy/carbon foam composites, lithium compounds/carbon foam composites, or metal oxide/carbon foam composites for use as an electrode to replace one of the electrodes in lithium ion batteries or other batteries. The carbon foam phase may also be doped with metal or transition metals.

The carbon phase of the porous carbon foam composites is derived from the polyimide precursor in the carbon composite, and has high surface area and a uniform pore size distribution. The surface area is above 300 $m^2$/gram when the pyrolysis is conducted at or below 1000° C.

The form of carbon foam composites can be either monolithic, or granular, or particles with irregular shapes.

The polyimide precursors may comprise other components in the molecular chain structure, such as phosphorous-(P) or boron-(B) or silicon-(Si) containing molecular structures, but have the composition of polyimide preferably greater than or equal to 50% by weight.

The polyimide precursors may comprise other polymer chains in the molecular structure, such as polybenzimidazole, but have the composition of polyimide preferably greater than or equal to 50% by weight.

Optionally, porous carbon foam composites may be prepared in such a manner that at least one surface of the composite is bound to another substrate, such as a bed of particles, woven or non-woven fiber pads, or a solid plate.

DETAILED DESCRIPTION OF PREFERRED EMBODIMENTS

The present invention relates to processes for producing AC/C composites from polyimide precursors, activated carbon powder, and optionally carbon fiber or other additives. The present invention further comprises electrochemical capacitors which use carbon electrodes which include AC/C composites.

In a first aspect, the present invention provides a method for preparing an AC/C composite comprising the steps of mixing a polyimide precursor powder, activated carbon powder, and optionally carbon fiber; compressing the mixture to form a monolith; and subjecting the compressed monolith to pyrolysis at temperatures in the range of approximately 700° C. to 3,000° C. under protection of an inert atmosphere to produce the AC/C composite. In a preferred embodiment, the mixture may be placed into a mold or on a substrate before being compressed into a monolith.

The polyimide precursor used in the process may comprise monomers of aromatic dianhydrides, aromatic diamines, and optionally aromatic polyamines with amine functionality at two or greater. In a preferred embodiment, the polyimide precursor is produced by combining p-phenylene diamine (PPD), dimethylacetamide (DMAc), and pyromellitic dianhyhydride (PMDA) and allowing the combination to react at an ambient temperature with stirring, followed by raising the temperature, preferably above 150° C., with strong agitation to produce polyimide precipitate, and removing the solvent under vacuum, preferably at approximately 50° C., then annealing the powders, preferably at approximately 300° C. for about 30 minutes to form a polyimide powder. The polyimide precursor powder may be mixed with the activated carbon powder, and optionally the carbon fiber, using a variety of known mixing procedures, most preferably blending. In yet another preferred embodiment, the activated carbon powder, and optionally carbon fiber, may be added to the polyimide precursor during the synthesis of the polyimide.

In a second aspect, the present invention provides an electrochemical capacitor comprising at least one electrochemical cell and at least a first and a second electrode, further comprising at least a first current collector connected to the first electrode, a second current collector connected to the second electrode, and a porous separator between the first and the second electrodes, wherein at least one of the electrodes comprises AC/C composites.

In a preferred embodiment, the porous separator is impregnated with a liquid electrolyte. In another preferred embodiment, one or more of the electrodes and one or more of the current collectors may comprise AC/C composites.

In a preferred embodiment, the invention provides an electrochemical capacitor comprising two or more electrochemical cells which are connected in series, wherein the adjoining cells are separated by a cell separator which is an electron conductor and ion insulator, and wherein the cell separator is bound to each of the adjacent electrodes to form biopolar plates. In this preferred embodiment, the bipolar plates may be made of AC/C composites as described herein.

In a preferred embodiment, the present invention provides an asymmetric capacitor comprising a carbon electrode comprising AC/C composites and a conventional electrode, which may comprise known electrode materials, preferably lead, nickel, cadmium, nickel, or lithium. This may be used for the purpose of increasing both the energy density and cycle life a battery. In a preferred embodiment, the invention may comprise an asymmetric lead oxide/carbon capacitor wherein the anode or a part of anode comprises AC/C composite and the cathode is a standard cathode for a lead acid battery. In this embodiment, both the anode and the anode current collector may comprise AC/C.

In some preferred embodiments of the invention, the AC/C composite used in an electrode of a capacitor may be doped with transition metals or metals. The metal doping on AC/C composite is accomplished by metal doping the polyimide precursor powder and/or metal doping the activated carbon powder and/or metal doping the AC/C composites. The general procedures of preparing such metal doped polyimide precursor powder and activated carbon have been described in U.S. Patent Publication Number 2006/0033226, the entire content of which is hereby incorporated by reference.

In a preferred embodiment, AC/C composite doped with metals may also be produced by dissolving a metal in a reaction solution of poly(amic acids), and allowing the formation of polyimide precipitate with metal deposited therein. The metal doped activated carbon powder is prepared by impregnating the carbon powder with a metallic compound solution. The solvent is removed from the carbon by distillation. Preferred transition metals or metals for doping in AC/C composite include the transition metallic compounds or metallic compounds containing metal ions of cobalt (Co), titanium (Ti), zirconium (Zr), vanadium (V), niobium (Nb), chromium (Cr), molybdenum (Mo), manganese (Mn), iron (Fe), ruthenium (Ru), nickel (Ni), palladium (Pd), copper (Cu), silver (Ag), zinc (Zn), lead (Pb), hafnium (Hf), tungsten (W), barium (Ba), aluminium (Al), platinum (Pt), silicon (Si), phorphorous (P), rhodium (Rh), antimony (Sb), tin (Sn), bismuth (Bi), or lithium (Li).

In a third aspect, the present invention provides processes for preparation of porous carbon foam composites incorporating other additives. These additives in the form of powders and fibers are preferably graphite, activated carbon, various forms of carbon, titanium oxide, silicon, silicon oxides, tin oxide, metals, metal alloys, metal oxides, metal nitrides, metal carbides, zeolite, or metallic compounds, a combination thereof. In a preferred embodiment of the invention, the carbon foam composite may be used to replace one of the electrodes in rechargeable lithium ion batteries and other batteries, as electrodes for electrochemical capacitors, asymmetric capacitors, hybrid electrochemical capacitors/batteries, fuel cells, sensors, water treatment facilities, and for applications as filtration media as well as supported catalysts on carbon.

In a preferred embodiment, the process of forming the carbon foam composites comprises the steps of: mixing a polyimide precursor powder, the additives, and optionally carbon fiber and/or powder; compressing into a monolith; and subjecting the compressed monolith to pyrolysis (which may affect the monolith) under the protection of an inert atmosphere. In a highly preferred embodiment, a graphite/carbon composite produced using this method may suppress the exfoliation of graphite and extend the cycle life of the rechargeable lithium ion batteries.

Carbon foam composites which can be produced using this process include graphite/carbon composites, silicon/carbon composites, silicon oxide/carbon composites, zeolite/carbon composites, tin oxide/carbon composites, metal alloy/carbon composites, metal/carbon composites, metal nitride/carbon composites, metal carbide/carbon composite, metallic compound/carbon composites, and metal oxide/carbon composites.

Metals or metal alloys appropriate for use as an additive include the metals of Co, Ag, Sb, Sn, Ti, Zr, V, Nb, Cr, Mo, Mn, Fe, Ru, Ni, Pd, Cu, Zn, Pb, Hf, W, Ba, Al, Pt, Si, P, Rh, Bi, Li, Ta, or any combination thereof, preferable alloys are Sn—Sb, Sn—Ag, Sb—Ag, Sn—Co, Sn—V, Sn—Ti, and Sn—Sb—Ag.

Metal oxides appropriate for use as an additive include the metal ions of Co, Sb, Sn, Ti, Zr, V, Nb, Cr, Mo, Mn, Fe, Ru, Ni, Pd, Cu, Ag, Zn, Pb, Hf, W, Ba, Al, Pt, Si, V, P, Rh, Bi, Li, and any combination thereof.

In a preferred embodiment, porous carbon foam composites are further reinforced by a polymer binder, such as polyvinyl fluoride (PVdF) or polytetrafluoride (PTFE). Deposition of the polymer binder may preferably be performed by dissolving the polymer binder into a solution, impregnating the solution into the composite, and removing the solvent by distillation.

In another preferred embodiment, silicon/carbon composites may be prepared by a process comprising the steps of: mixing a polyimide precursor powder, silicon monoxide powder, optionally graphite, and optionally carbon fiber; compressing into a monolith; and subjecting the compressed monolith to pyrolysis under the protection of an inert atmosphere.

In another preferred embodiment, silicon/carbon and/or silicon oxide/carbon composites may be prepared by a process comprising the steps of: dissolving polysiloxane in poly (amic acids) solution before the imidization of poly(amic acids) at an elevated temperature to produce polyimide/polysiloxane precipitates; mixing the polyimide/polysiloxane precipitates with graphite powder, and optionally carbon fiber or powder; compressing into a monolith; and subjecting the compressed monolith to pyrolysis under the protection of an inert atmosphere.

In a fourth aspect, the present invention provides processes for preparation of metal doped carbon foam composites that applies metal doped polyimide precursor as one carbon phase and incorporates active materials including carbon, graphite, silicon, silicon oxides, zeolite, various metal oxides, metal alloys, metallic compounds, and metals.

A preferred embodiment of the invention provides a method for preparing a metal doped carbon foam composite, comprising the steps of: mixing a polyimide precursor powder doped with transition metals, the additives, and optionally carbon powder/fiber; compressing into a monolith; and subjecting the compressed monolith to pyrolysis at temperatures in the range of approximately 700° C. to 3,000° C. under protection of an inert atmosphere. If the additives include activated carbon powder, activated carbon powder can be doped with transition metals before pyrolysis. In a preferred embodiment, the transition metal is platinum or cobalt A metal doped carbon foam composite may also be prepared according to the invention by a process comprising the steps of: mixing a metal powder with polyimide precursor powder, activated carbon powder, and optionally carbon fiber; compressing into a monolith; and subjecting the compressed monolith to pyrolysis at temperatures in the range of approximately 700° C. to 3000° C. under protection of an inert atmosphere. In a preferred embodiment, the metal may be platinum.

In a preferred embodiment, a transition metal doped carbon/zeolite composite may be used as filtration medium, particularly for application in air filters to remove water using zeolite, or to remove oxygen and nitrogen oxides from working gas streams using transition metal doped carbon. One of the preferred transition metals for this application is manganese (Mn). One of the preferred working gas streams is ammonia.

Another preferred application of transition metal doped AC/C composites is as a transition metal catalyst supported on porous carbon. Preferred transition metals include platinum and cobalt. Preferred applications include fuel cells such as PEM fuel cells.

In a fifth aspect, the invention provides a process for preparing AC/C composites and porous carbon composites to be supported on another substrate, which binds to at least one surface of the composites. In a preferred embodiment, this process comprises the steps of: mixing polyimide precursor powder and other materials including carbon, or titanium oxide, or silicon, or silicon oxides, or zeolite, or metal oxides, or metal, or metal nitrides, or metal alloys, or metallic compounds; compressing the mixture into a substrate; and subjecting the compressed mixture and substrate to pyrolysis at temperatures in the range of approximately 700° C. to 3,000° C. under protection of an inert atmosphere. Appropriate substrates include be woven or non-woven fiber pads, a bed of solid particles, or a solid plate.

In each of the above aspects of the invention, the porous carbon foam composites can be either monolithic or granular or irregularly shaped. Monolithic porous carbon foam composites are preferable for electrode materials. Porous carbon foam composites in the form of particles or granules may be bound into a monolith by a polymer binder, such as polyvinyl fluoride (PVdF) or polytetrafluoride (PTFE).

In preferred embodiments of the above aspects of the invention, the mixing of polyimide precursor powder with other additives is conducted by simply mixing the dry ingredients together. However, other procedures of mixing, such as immersing the ingredients in a solvent or water to form a uniform wet paste before removing the solvent or addition of additives to the reaction system of polyimide precursor during the synthesis, are also appropriate. When additives are added to a poly(amic acids) solution or to a monomer solution, the polyimide precursor may be precipitated onto the additives as a thin film during the subsequent synthesis.

In the aspects of the invention described above, the polyimide precursors may comprise other components, such as P- or B- or Si-containing molecular structures, but have the composition of polyimide preferably greater than or equal to about 50% by weight. In the above embodiments, the P or B or Si containing polymers or compounds can be added to poly(amic acids) solution followed by thermal imidization to form polyimide precursor precipitates which contain P or B or Si components. Alternatively, P- or B- or Si-containing compounds are chemically grafted onto one of the monomers that are polymerized to form poly(amic acids), and then used to form polyimide precursor.

An electrochemical device generally consists of at least one electrochemical cell and at least two current collectors which are connected to two separate electrodes, respectively. Each electrochemical cell comprises two electrodes, a separator sandwiched between the electrodes, and an electrolyte that impregnates pores of electrodes and separator. Each electrode comprises one or more than one electrode plates that are electrically connected. The present invention provides electrochemical devices wherein at least one of said electrode plates comprises AC/C composites or/and porous carbon composite. Optionally, said electrochemical devices comprise AC/C composites or porous carbon composites functioning both as an electrode and a current collector.

An electrochemical cell generally comprises at least two electrodes immersed in a liquid electrolyte and separated spaciously. Optionally, catalysts are deposited onto the electrodes. The present invention provides electrochemical devices wherein at least one of said electrodes comprises porous carbon composites or AC/C composites. One application of such an electrochemical device is used for capacitive desalination, in which water is the liquid electrolyte.

EXAMPLE 1

Preparation of AC/C Composite and Application of AC/C Composite as Electrode to Replace Anode of Lead Acid Battery 1.1 Preparation of Polyimide Precursor Powder 1.622 gram (0.015 mole) p-phenylene diamine (PPD) was dissolved in 40 ml dimethylacetamide (DMAc) in a flask. While stirring, 3.270 gram (0.015 mole) pyromellitic dianhydride (PMDA) was added to the reaction system. The reaction was carried out at ambient temperature with stirring until a viscous solution was formed. The reaction temperature was raised to 150° C. with strong agitation to produce polyimide precipitate. The solvent was distilled off under vacuum at 50° C. The powders were further annealed at 300° C. for 30 minutes to form polyimide powder.

1.2 Preparation of AC/C Composite 9.0 grams of polyimide powder prepared as above, 6.1 grams of activated carbon powder, and 0.84 grams of carbon fiber were mixed and blended into a homogeneous mixture. The mixture was compressed at 5,500 psi at ambient temperature into a 2" by 2" plate. The plate was pyrolyzed at 800° C. under protection of nitrogen for 3 hours to produce AC/C composite with a density of 0.5 g/cc and a thickness of 7 mm.

1.3 Applying AC/C Composite as an Anode in Asymmetric Lead Oxide Capacitor

An asymmetric capacitor was fabricated by using a lead oxide cathode with the lead current collector from a commercial lead acid battery. The anode was AC/C composite prepared in section 1.2, above. A non-conducting porous separator was sandwiched between the two electrodes. A sulfuric acid electrolyte was used to impregnate the pores of electrodes and separator. The device was fabricated with a great excess of energy capacity of cathode compared to the anode.

The cumulated energy capacity of anode half cell during discharge at 100 mA reached 110 Wh/kg.

REFERENCES CITED

The following references, to the extent that they provide exemplary procedural or other details supplementary to those set forth herein, are specifically incorporated herein by reference.

U.S. PATENT DOCUMENTS

U.S. Pat. No. 5,172,307, issued on Dec. 15, 1992, with Tabuchi et al. listed as inventors.
U.S. Pat. No. 5,369,546, issued on Nov. 29, 1994, with Saito et al. listed as inventors.
U.S. Pat. No. 5,776,633, issued on Jul. 7, 1998, with Mrotek et al. listed as inventors.
U.S. Pat. No. 5,973,912, issued on Oct. 26, 1999, with Kibi et al. listed as inventors.
U.S. Patent Publication No. 2006/0033225, published on Feb. 16, 2006, with Wang listed as the inventor.
U.S. Patent Publication No. 2006/0033226, published on Feb. 16, 2006, with Wang listed as the inventor.
PCT Patent Publication WO 2006/023419, published Feb. 3, 2006, with Wang listed as the inventor.

What is claimed is:

1. A process for producing porous carbon foam composite, comprising the steps of:
   preparing a polyimide precursor powder;
   mixing the polyimide precursor powder with an additive or additives in the form of powder, fiber, or both, to form a mixture;
   consolidating the mixture of unmelted polyimide precursor powder and the additive or additives; and
   pyrolyzing the consolidated mixture in an inert atmosphere to produce the porous carbon foam composite;
   wherein the polyimide precursor powder is formed by imidization of poly(amic acids).

2. The process of claim 1, wherein the additive is selected from the group consisting of carbon, zeolite, graphite, silicon, silicon oxides, tin oxides, titanium oxides, vanadium oxides, metals, metal alloys, metal oxides, metal nitrides, metal carbides, metallic compounds, silicon-containing polymers, boron containing polymers, and phosphorus containing polymers, inorganic compounds and organic compounds, and mixtures and combinations thereof.

3. The process of claim 1, wherein the additive is mixed with the polyimide precursor powder after imidization and before solvent removal to produce the mixture.

4. The process of claim 1, wherein the additive is added in the solution of poly(amic acids) before imidization and solvent removal to produce the mixture.

5. The process of claim 1, wherein the porous carbon foam composite is an activated carbon/carbon (AC/C) composite, and wherein the additive comprises activated carbon powder, carbon fiber, or a mixture thereof.

6. The process of claim 1, wherein the mixture is compressed under pressure in the range of about 2,000 psi to about 13,000 psi.

7. The process of claim 1, wherein pyrolysis is conducted in a temperature range of about 600° C. to about 3,500° C.

8. The process of claim 1, wherein consolidation of the mixture is performed by contacting the mixture with a substrate with at least one surface of the consolidated mixture binding to the substrate.

9. The process of claim 8, wherein the substrate comprises a solid plate, a woven metal mesh, a bed of solid particles, a woven fiber pad, and a non-woven fiber pad.

10. The process of claim 1, wherein the porous carbon foam composite is monolithic, granular, or irregularly shaped.

11. The process of claim 1, wherein a metallic compound is added during the preparation of the polyimide precursor powder or added to the mixture.

12. The process of claim 11, wherein the porous carbon foam composite is an activated carbon/carbon (AC/C) composite, and wherein the additive comprises activated carbon powder, carbon fiber, or a mixture thereof.

13. The process of claim 11, wherein the metallic compound comprises metals selected from the group consisting of: Ti, Zr, V, Nb, Cr, Mo, Mn, Fe, Ru, Co, Ni, Pd, Cu, Ag, Zn, Pb, Hf, W, Ba, Al, Pt, Si, P, As, Li, Ga, Sn, Bi, V, Li, Mg, Ca, Sr, B, In, Si, Ge, Sc, Y, and combinations thereof.

* * * * *